United States Patent
Lavertu et al.

(10) Patent No.: US 10,018,130 B2
(45) Date of Patent: Jul. 10, 2018

(54) FUEL INJECTOR WEAR COMPENSATION METHODOLOGY BY ALTERING INJECTION SCHEDULE

(71) Applicant: GENERAL ELECTRIC COMPANY, Schenectady, NY (US)

(72) Inventors: Thomas Michael Lavertu, Clifton Park, NY (US); Adam Edgar Klingbeil, Ballston Lake, NY (US); Roy James Primus, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 2 days.

(21) Appl. No.: 15/087,247

(22) Filed: Mar. 31, 2016

(65) Prior Publication Data
US 2016/0333814 A1 Nov. 17, 2016

Related U.S. Application Data

(63) Continuation-in-part of application No. 14/708,920, filed on May 11, 2015.

(51) Int. Cl.
*F02D 41/00* (2006.01)
*F02D 41/14* (2006.01)
(Continued)

(52) U.S. Cl.
CPC ..... *F02D 41/0027* (2013.01); *F02D 41/0025* (2013.01); *F02D 41/1454* (2013.01);
(Continued)

(58) Field of Classification Search
CPC .............. F02D 41/0027; F02D 41/405; F02D 41/0025; F02D 41/401; F02D 41/2467; F02D 41/1454; F02D 19/061
See application file for complete search history.

(56) References Cited

U.S. PATENT DOCUMENTS 7,178,492 B2 2/2007 Coleman et al.
7,571,601 B2 8/2009 Lee
(Continued)

FOREIGN PATENT DOCUMENTS

JP 2004211571 A * 7/2004

OTHER PUBLICATIONS

Choi et al., "Comparison of the effects of multiple injection strategy on the emissions between moderate and heavy EGR rate conditions: part 2—post injections", Journal of Mechanical Science and Technology, vol. 27, Issue: 7, pp. 2217-2223, Jul. 2013.

*Primary Examiner* — Joseph Dallo
(74) *Attorney, Agent, or Firm* — GE Global Patent Operation; Pabitra Chakrabarti

(57) ABSTRACT

Fuel injector wear compensation methodologies for use with internal combustion engines that alter the injection schedule over the life of the fuel injector(s) by using methods that conduct a primary injection of fuel in the engine (primary fuel event), per an injection schedule within an engine cycle; compare a measured engine parameter(s) to a reference value(s); and then alter the injection schedule applied to the engine, based on the comparing. Another method comprises: during injection events, inject a first fuel in a combustion chamber of the engine; measure an engine parameter(s) of the engine during operation; compare the engine parameter(s) to a reference value(s); add a post injection event of a second fuel during the injection events, based on the comparison. The methods can be applied with single or dual fuels.

24 Claims, 8 Drawing Sheets

(51) Int. Cl.
*F02D 41/24* (2006.01)
*F02D 41/40* (2006.01)
*F02D 19/06* (2006.01)

(52) U.S. Cl.
CPC ....... *F02D 41/2467* (2013.01); *F02D 41/401* (2013.01); *F02D 41/405* (2013.01); *F02D 19/061* (2013.01); *Y02T 10/36* (2013.01); *Y02T 10/44* (2013.01)

(56) References Cited

U.S. PATENT DOCUMENTS

| | | | |
|---|---|---|---|
| 7,849,672 B2 | 12/2010 | Shibata et al. | |
| 7,885,754 B2 | 2/2011 | Topinka et al. | |
| 8,312,865 B2 | 11/2012 | Dixon et al. | |
| 8,341,939 B2 | 1/2013 | Lee | |
| 9,157,385 B2 | 10/2015 | Gallagher et al. | |
| 2003/0164166 A1* | 9/2003 | Takeuchi | F02D 41/0085 123/674 |
| 2005/0022506 A1* | 2/2005 | Nishizawa | F01N 3/0842 60/276 |
| 2005/0022513 A1* | 2/2005 | Kitahara | F01N 3/0814 60/285 |
| 2005/0039444 A1* | 2/2005 | Nishizawa | F02D 41/027 60/285 |
| 2008/0115485 A1 | 5/2008 | Lee | |
| 2009/0063018 A1* | 3/2009 | Takeuchi | F02D 41/1497 701/104 |
| 2010/0088008 A1* | 4/2010 | Tanaka | F02D 19/0684 701/104 |
| 2010/0168988 A1* | 7/2010 | Ruiz | F02D 31/007 701/110 |
| 2010/0170474 A1* | 7/2010 | Yamaguchi | F02D 31/008 123/339.12 |
| 2010/0294236 A1* | 11/2010 | Surnilla | F02D 41/0025 123/304 |
| 2013/0325301 A1* | 12/2013 | Gautier | F02D 41/2438 701/104 |

* cited by examiner

FUEL INJECTOR WEAR COMPENSATION METHODOLOGY BY ALTERING INJECTION SCHEDULE

CROSS-REFERENCE TO RELATED APPLICATIONS

This Continuation-In-Part (C.I.P.) application claims priority to the May 11, 2015 filing date of, commonly assigned, U.S. application Ser. No. 14/708,920, Entitled: FUEL INJECTOR WEAR CORRECTION METHODOLOGY. The contents of which are incorporated herein by reference in its entirety.

BACKGROUND OF THE INVENTION

The present invention relates generally to fuel injectors and the wear of fuel injectors over time and more particularly to a fuel injector wear compensation methodology that alters the injection schedule within an engine cycle over time.

As with many internal combustion engine components, fuel injectors are known to wear with use over time. This wear impacts the fuel injector's injection characteristics. In turn, effects on the engine using the worn fuel injector(s) result. With high pressure fuel injectors, in particular, fuel can cavitate in the nozzle of the fuel injector causing uneven wear over time. This uneven wear can cause further cavitation in the nozzle. Cavitating fuel, ultimately, can act as a restriction on fuel flow, reducing the effective discharge coefficient of the fuel nozzle, thereby resulting in reduced fuel flow through the fuel injector nozzle for a given commanded injection duration and pressure. This fuel injector performance degradation, in turn, ultimately affects engine performance and efficiency. With fuel injector wear there is also a concomitant increase in particulate matter (PM) in the exhaust emissions.

Accordingly, there is an ongoing need for both improving upon an understanding of these fuel injector wear characteristics and then also accounting for this improved understanding in the operation of engines and their fuel injector systems.

BRIEF DESCRIPTION

The present invention overcomes at least some of the aforementioned drawbacks by providing a fuel injector wear compensation methodology that alters the injection schedule within an engine cycle so as to address the problem of efficiency drift over time (and/or the life) of a fuel injector caused by, amongst other items, nozzle wear. This invention, in turn, allows for improvement of engine efficiency over the life and wear of the fuel injector(s) therewith.

Therefore, in accordance with one aspect of the invention, a method of injecting fuel in an internal combustion engine, the method comprises: conducting a primary injection of a first fuel in the internal combustion engine, thereby defining a primary fuel event, according to an injection schedule within an engine cycle; comparing a measured engine parameter to a reference value; and altering the injection schedule applied to the internal combustion engine, based on the comparing.

According to another aspect of the present invention, a method of operating a fuel injected internal combustion engine, the method comprises: during injection events, injecting a first fuel in a combustion chamber of the fuel injected internal combustion engine; measuring at least one engine parameter of the fuel injected internal combustion engine during operation; comparing the at least one engine parameter to a reference value; adding a post injection event of a second fuel during the injection events, based on the comparing.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %,"

etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

Aspects of the present invention have been shown to offer advantages over previous methodologies of injecting fuel in internal combustion engines. These compensation methodologies can address the issue of significant efficiency drift over the life of a fuel injector, often caused by wear of the nozzle and other injector components (e.g., orifice plate, injector body, etc.). These methodologies can also improve the engine efficiency and emissions over the life of the fuel injector(s).

Figure 1:
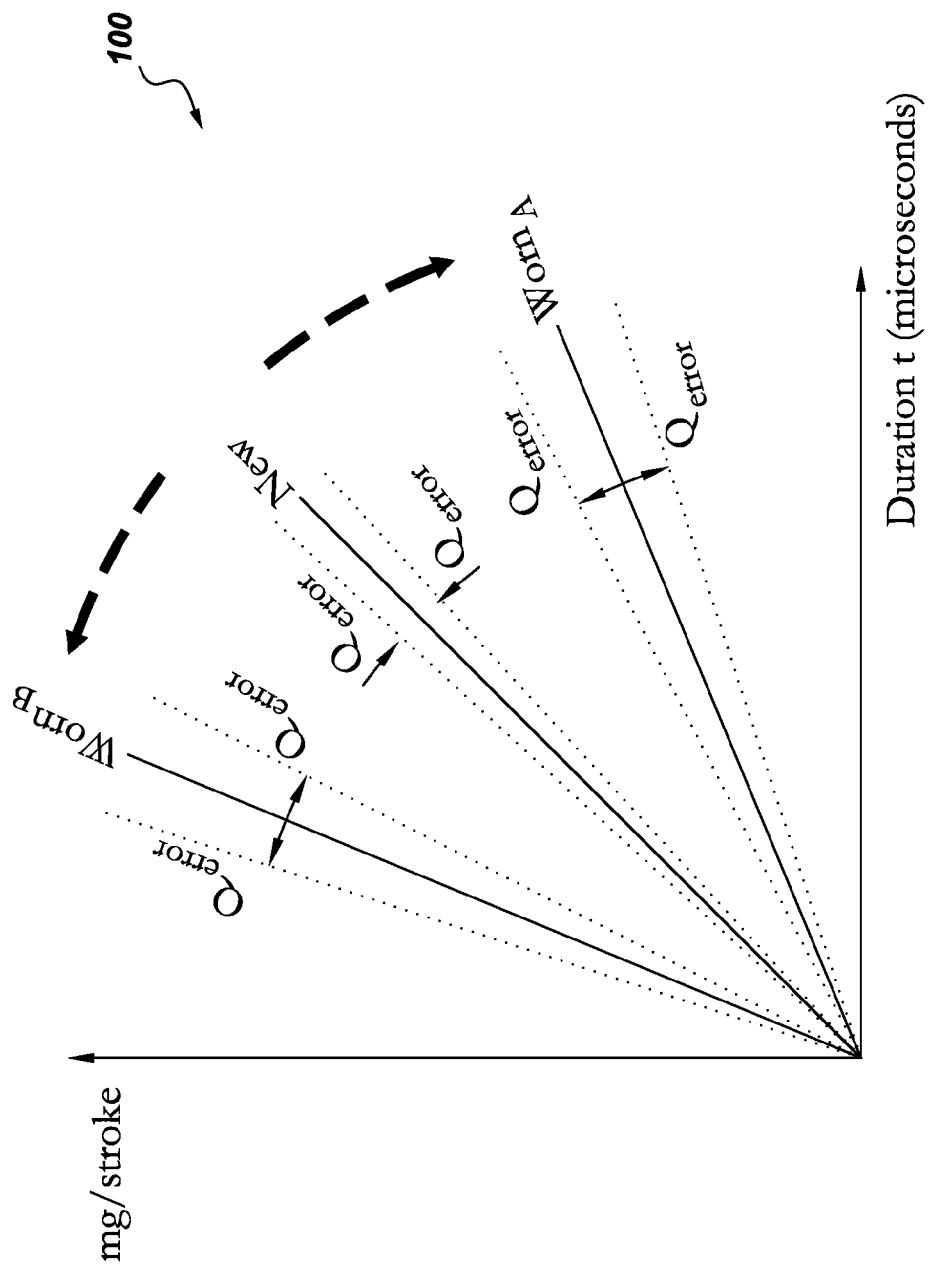
FIG. 1 is an x-y graph comparing fuel quantity per stroke as a function of injection duration at a given injection pressure for exemplary new and worn fuel injectors.

Referring to FIG. 1, a graph depicting and comparing the quantity of fuel delivered, Q, for a given injection duration, t, for various hypothetical fuel injectors is denoted as 100. As shown, the y axis, in units for fuel quantity (e.g., mg/stroke), is compared to the x axis, in units of time of injection duration (e.g., micro-seconds). The graph (not to scale) is illustrating fuel quantities per stroke of various exemplary fuel injectors over time. As shown, a new fuel injector (labelled "New") has a certain specified fuel quantity delivered for a specified injection duration (depicted by the solid line). The dotted lines (labelled "$Q_{error}$"), on either side of the solid line, signify a scatter of the various actual fuel quantities for a number of "n" injectors that may differ from the specified fuel quantity due to, for example, production and manufacturing imperfections and the like. As the new fuel injector is used over time, the fuel injector becomes worn and performance of the fuel injector typically changes over time. As the two other graph lines (labelled "$Worn_B$" and "$Worn_A$") illustrate, worn fuel injector may have a greater or lesser fuel quantity delivered per commanded injection duration over time than the same new fuel injector model. For example, the $Worn_A$ injector experiences a reduced flow quantity over time and wear (See e.g., FIGS. 2A and 2B). Contrastingly, the $Worn_B$ injector experiences an increased flow quantity over time and wear (See e.g., FIGS. 3A and 3B). Similarly, the worn fuel injectors (e.g., $Worn_A$, $Worn_B$) may have a larger magnitude of error in fuel quantities than the new fuel injector's magnitude of error.

Figure 2A:
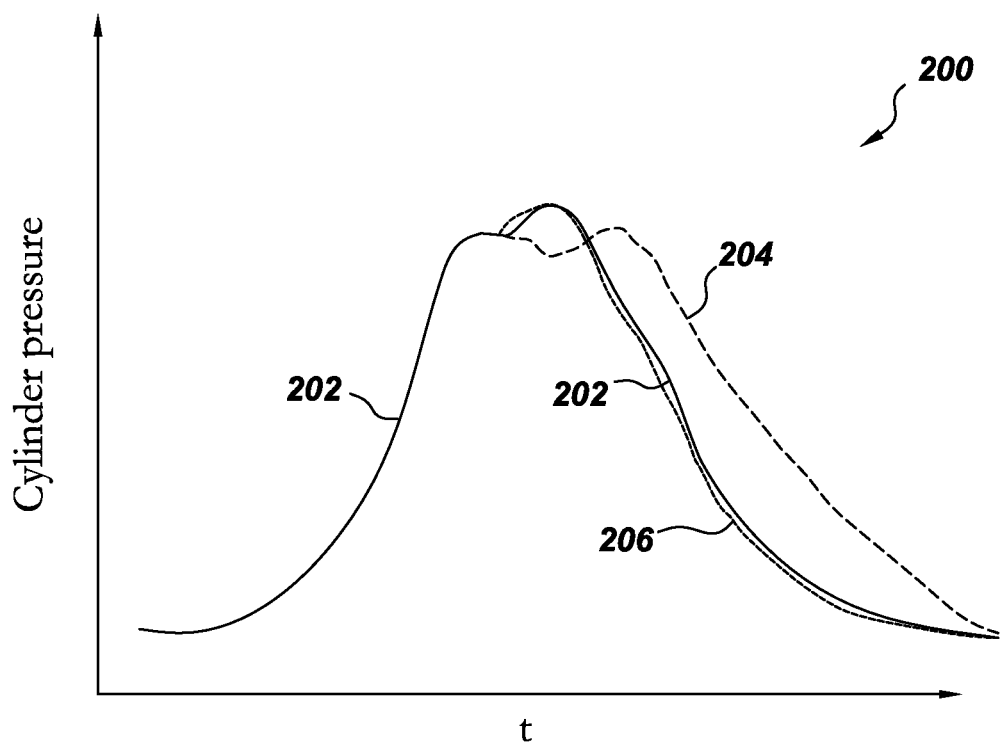
FIG. 2A is an x-y graph comparing cylinder pressure over time of a single compression-combustion-expansion sequence for a fuel injector, according to embodiments of the present invention.
Figure 2B:
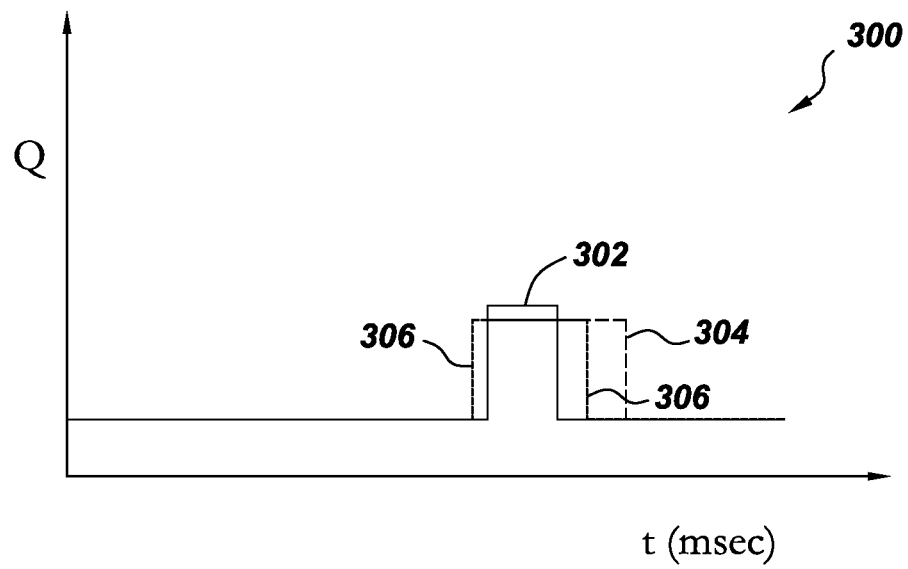
FIG. 2B is an x-y graph comparing the fuel flow of the fuel injector over the same single compression-combustion-expansion sequence from FIG. 2A, according to embodiments of the present invention.

FIGS. 2A and 2B show cylinder activity for a hypothetical single power stroke (time) of fuel injector that after wear may have reduced flow (e.g., $Worn_A$). FIG. 2A shows the cylinder pressure over the single compression-combustion-expansion sequence at 200. Comparatively FIG. 2B shows at 300 the fuel flow over time of a fuel injector over the same in-cylinder processes as that in FIG. 2A. More specifically FIG. 2A details typical cylinder pressures for a single compression-combustion-expansion sequence for a cylinder having a new fuel injector at 202. Over time, as the fuel injector wears, the cylinder pressure suffers a time-lag (e.g., moves to right on x-axis) over time as depicted by long-dashed line 204. By using the methods described in the reference application (U.S. application Ser. No. 14/708,920), the cylinder pressure of the cylinder is moved back towards the left on the x-axis to counterbalance the effect of fuel injector wear, as denoted by 206. As the dashed line 206 depicts, the methods described in the reference application (U.S. application Ser. No. 14/708,920) include adjusting the timing so that the resultant cylinder pressure for each power stroke more closely emulates that of the cylinder pressure in a cylinder having the new fuel injector 202.

FIG. 2B shows, not to scale, a typical fuel flow in a single cylinder over time for a single power stroke event (e.g., the power stroke event of FIG. 2A) for a fuel injector. At 302, a typical new fuel injector may inject fuel over a finite duration of time (e.g., 5000 μsec). Over use as discussed herein the fuel injector wears and its performance degrades. As a result, in order to achieve the same desired power output with the worn fuel injector as with the new injector, the associated engine controller(s) adjusts the duration of time of the injection event. As line 304 depicts, the overall time duration of the fuel injection event is lengthened such that it is longer in duration than the time duration for fuel injection event with the new injector (i.e., 302). For example, the new adjusted duration may be 5500 μseconds. When using the methods herein with the fuel injector system, the resultant fuel flow curve may appear as the line depicted at 306. That is, as 306 shows, the methods herein will adjust the timing by moving the start time of the fuel injection event earlier than the start of the fuel injection event for the new injector 302. The methods may also adjust the timing by moving the finish time of the time injection event 306 earlier than the finish time of the time injection event 304. In this manner, the power generated from the cylinder's power stroke with the worn fuel injector will closely match the power derived from the cylinder with the new fuel injector and the end time of the injection event with the worn injector will more closely match the end time of the injection event as that with the new injector.

As an alternative to the scenario in FIGS. 2A and 2B, the injection duration may be held constant in some cases. For this case, the fuel quantity supplied will vary as the injector wears. If the wear is such that the fuel quantity decreases, then the engine power output will suffer, resulting in a negative impact on performance with possible effects on emissions. If the wear is such that the fuel quantity increases, then the engine may operate at too high a power level, resulting excessive stress in the mechanical components which may impact reliability, as well as potential negative impacts on emissions.

Figure 3A:
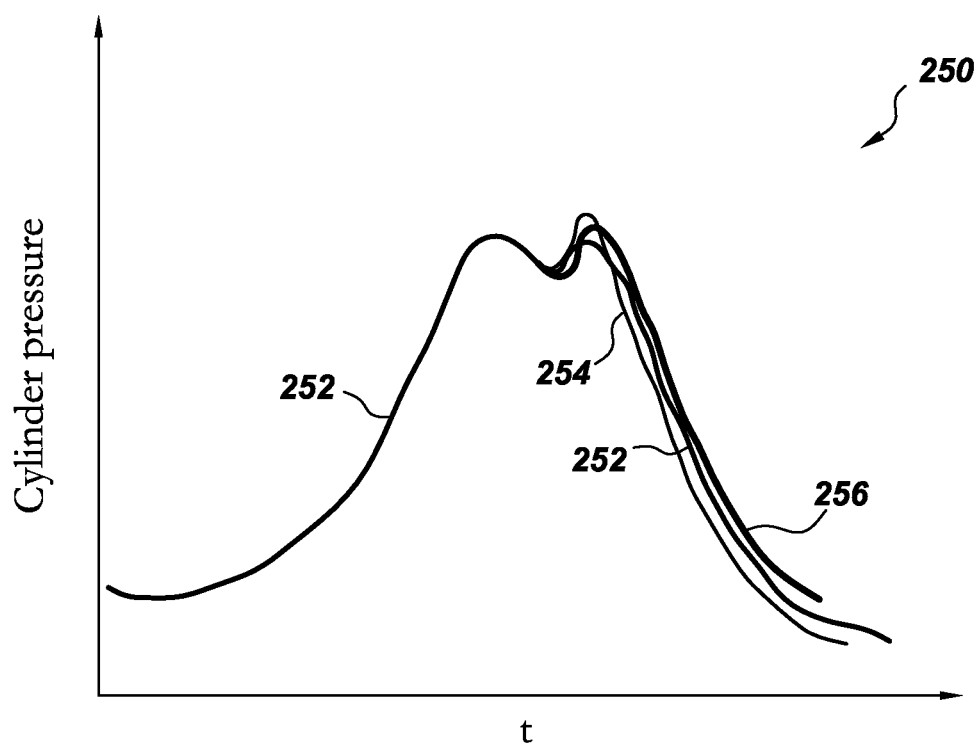
FIG. 3A is an x-y graph comparing cylinder pressure over time of a single compression-combustion-expansion sequence for a fuel injector, according to other embodiments of the present invention.
Figure 3B:
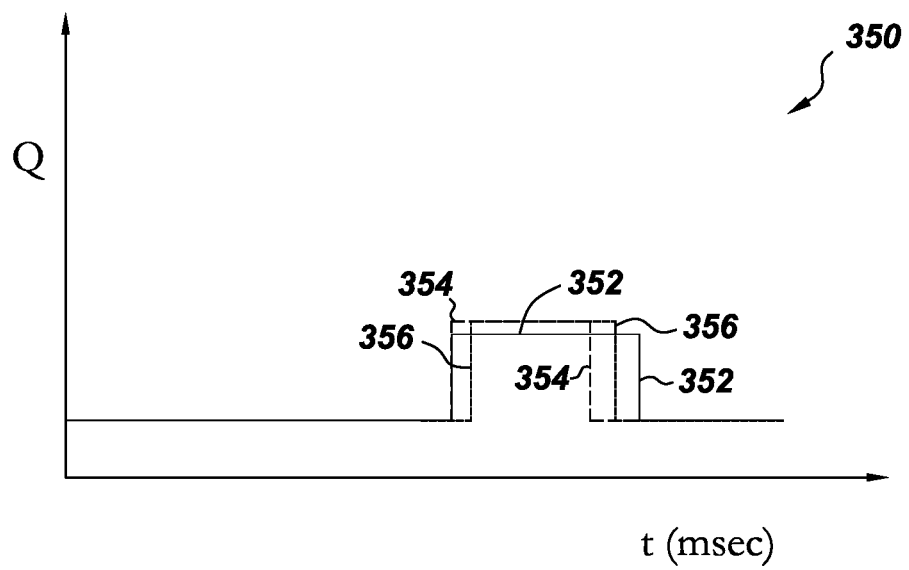
FIG. 3B is an x-y graph comparing the fuel flow of the fuel injector over the same single compression-combustion-expansion sequence from FIG. 3A, according to embodiments of the present invention.

FIGS. 3A and 3B show cylinder activity for a hypothetical single combustion event (time) of fuel injector that after wear may have increased flow (e.g., $Worn_B$). FIG. 3A shows the cylinder pressure over the single compression-combustion-expansion sequence at 250. Comparatively FIG. 3B shows at 350 the fuel flow over time of a fuel injector over the same power stroke as that in FIG. 3A. More specifically FIG. 3A details typical cylinder pressures for a single power stroke for a cylinder having a new fuel injector at 252. Over time, as the fuel injector wears and flow increases, the cylinder pressure increase starts earlier (e.g., moves to left on x-axis) over time as depicted by line 254. By using the methods described in the reference application (U.S. application Ser. No. 14/708,920), the cylinder pressure of the cylinder is moved back towards the right on the x-axis to counterbalance the effect of fuel injector wear, as denoted by 256. As the solid bold line 256 depicts, the methods described in the reference application (U.S. application Ser. No. 14/708,920) include adjusting the timing so that the resultant cylinder pressure for each power stroke more closely emulates that of the cylinder pressure in a cylinder having the new fuel injector 252.

FIG. 3B shows, not to scale, a typical fuel flow in a single cylinder over time for a single power stroke event (e.g., the power stroke event of FIG. 3A) for a fuel injector at 350. At 352, a typical new fuel injector may inject fuel over a finite duration of time (e.g., 5000 μsec). Over use as discussed herein the fuel injector wears and its performance degrades. As a result, in order to achieve the same desired power output with the worn fuel injector as with the new injector, the associated engine controller(s) adjusts the duration of time of the injection event. As line 354 depicts, the overall time duration of the fuel injection event is shortened such that it is shorter in duration than the time duration for fuel injection event with the new injector (i.e., 352). For example, the new adjusted duration may be 4500 μseconds. When using the methods herein with the fuel injector system, the resultant fuel flow curve may appear as the line depicted at 356. That is, as 356 shows, the methods herein will adjust the timing by moving the start time of the fuel injection event later than the start of the fuel injection event for the new injector 352 and/or the start time for the adjusted fuel injection 354. The methods may also adjust the timing by moving the finish time of the time injection event 356 later than the finish time of the adjusted time injection event 354. In this manner, the power generated from the cylinder's power stroke with the worn fuel injector will closely match the power derived from the cylinder with the new fuel injector and the end time of the injection event with the worn injector will more closely match the end time of the injection event as that with the new injector.

Figure 4:
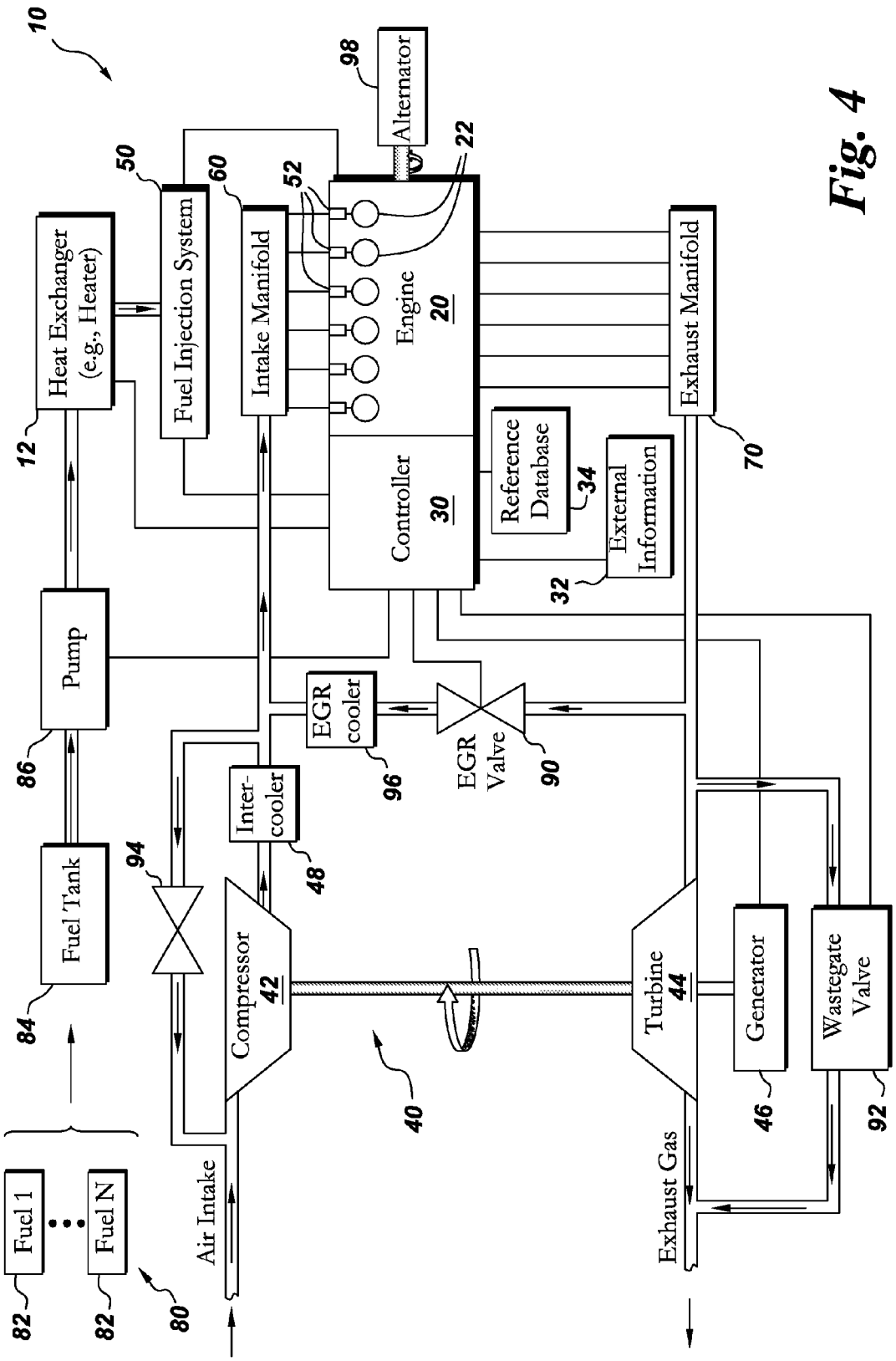
FIG. 4 is a schematic diagram of an engine system that employs aspects of the present invention.

Referring to FIG. 4, a schematic diagram of one embodiment of an engine system 10 that can use the various methods disclosed herein is shown. The engine system 10 may comprise an engine 20 having one or more cylinders 22 having one or more fuel injectors 52 associated with each cylinder 22. The engine has one or more controller(s) 30 associated therewith. Each cylinder 22 may have one or more fuel injector(s) 52 associated therewith. The fuel injector(s) 52 are associated with a fuel injection system 50.

Further associated with the engine 20 may be an intake manifold 60 and an exhaust manifold 70. As shown, the engine system 10 includes a turbocharger 40 comprising an intercooler 48, a compressor 42 and turbine 44 and a rotatable shaft there between.

Other aspects of the engine system 10 may include a fuel tank 84, pump 86, and heat exchanger 12. The fuel tank(s) 84 may comprise a plurality of fuels 80, including from a "fuel 1" 82 up to a "fuel N" 82. In this manner, the engine 20 may be configured to operate on a plurality of fuels 80. The engine system 10 may comprise an EGR system comprising a bypass line, EGR cooler 96, and EGR valve 90. The engine system 10 may comprise a compressor bypass line and compressor bypass valve 94 in the air intake line. The engine system 10 may comprise a generator 46 operatively attached to the turbine 44 and an alternator/generator 98 operatively attached to a rotating shaft (e.g., crankshaft) of the engine 20. The engine system 10 may comprise a wastegate valve 92 and bypass line in the exhaust gas line.

It should be apparent that a variety of configurations of engine system 10 are possible in addition to the embodiment shown in FIG. 4. By way of example and not limitation, the engine system 10 may use variable geometry devices (e.g., compressor and/or turbine) and the like. Similarly, various known operational aspects and methods of the engine system 10 are not repeated here for clarity purposes only.

As shown, the controller 30 is operatively attached to several elements of the engine system 10 including the fuel injection system 50 and a reference database 34 and external information 32. External information 32 may include, for example, information related to air temperature, oil temperature, altitude information, and/or atmospheric pressure. The reference database 34 may include information related to the engine system 10 including, for example, injection schedules 407 (see e.g., FIG. 5), reference values 406 (see e.g., FIG. 5), a compressor map, a volumetric efficiency model, a predetermined injection timing map, and/or various engine models. An injection schedule 407, which occurs within an engine cycle, is a schedule of fuel injection within a thermodynamic cycle of engine cylinder. The injection schedule 407 may comprise the quantity of injections per cycle, timing and duration of injections, dwell or spacing between injections, and injection pressure.

Figure 5:
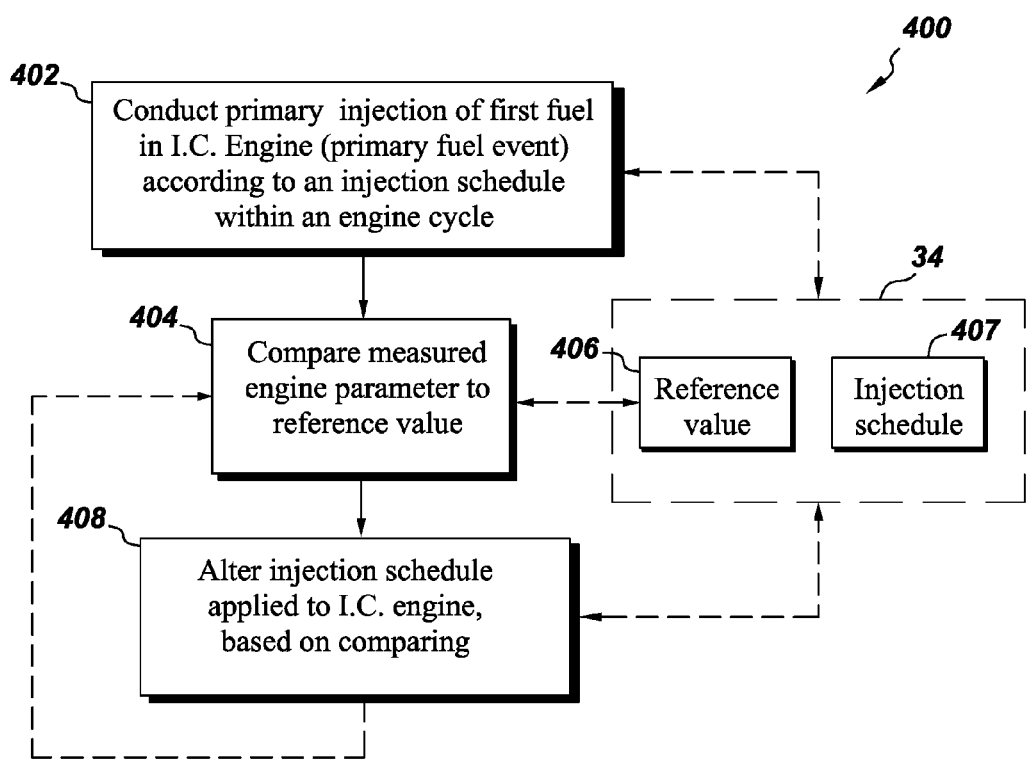
FIG. 5 is a flowchart of a method of use according to an embodiment of the present invention.
Figure 6:
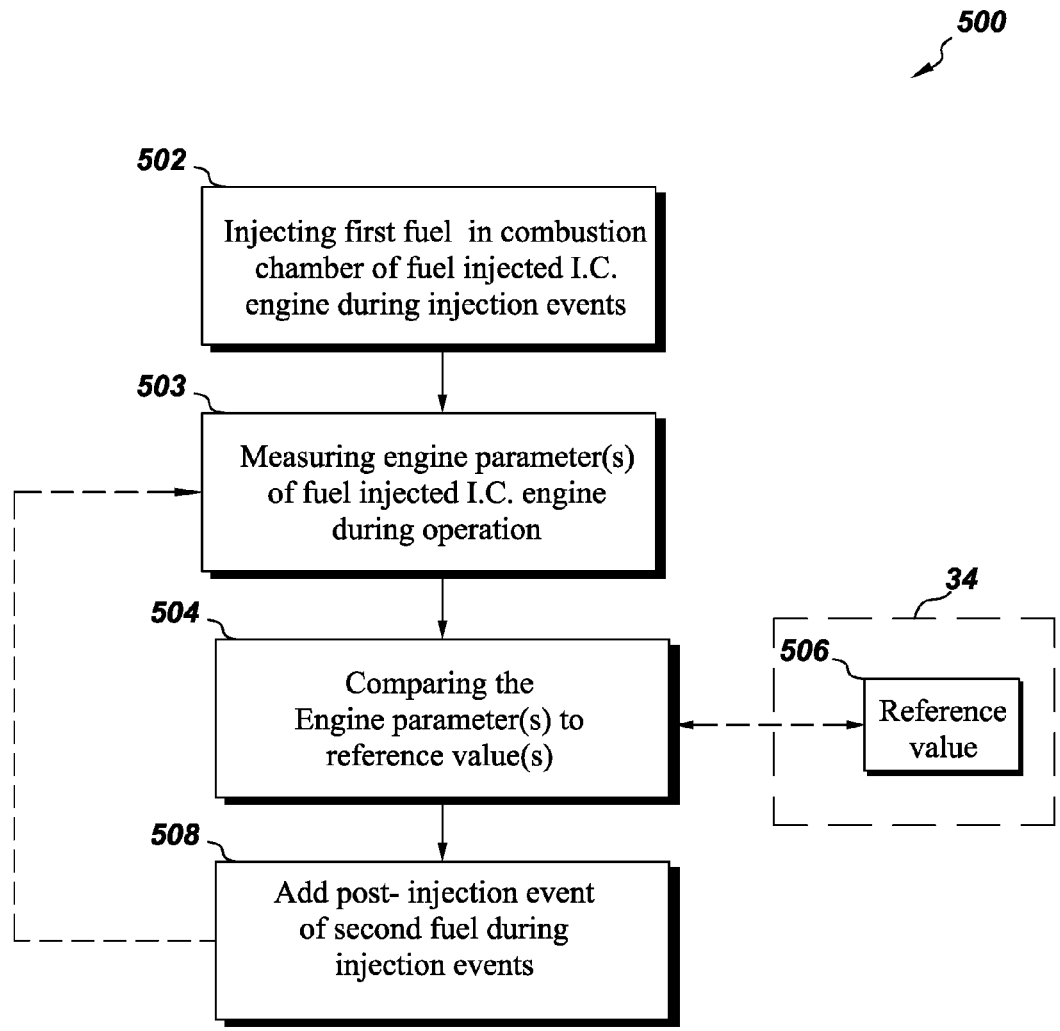
FIG. 6 is a flowchart of a method of use according to another embodiment of the present invention.

Referring collectively to FIGS. 5 and 6, flowcharts depicting methods of applying a fuel injector wear compensation methodologies by altering injection schedules are shown. A first method is illustrated as 400 in FIG. 5 and a second method is illustrated as 500 in FIG. 6. As FIG. 5 illustrates, a method 400 includes first conducting a primary injection of a first fuel in an internal combustion engine at 402, thereby defining a primary fuel event, according to an injection schedule, contained in the reference database 34 (see e.g., FIG. 4). Then the method 400 compares one or more measured engine parameters 404 to one or more reference values 406 contained in a referenced database 34 (see e.g., FIG. 4). Based on the comparing at 404, the method 400 alters the injection schedule applied to the internal combustion engine at 408. As the dotted return arrow shows, after 408 (i.e., altering injection schedule) the method 400 may repeat back to step 404 (i.e., comparing).

That is the one or more elements of the injection schedule may be altered as a result of comparing a measured engine parameter(s) to a reference value(s). For example, the quantity of injection(s) may be altered (e.g., increased or decreased) under the injection schedule alteration. Additionally or alternatively, at least one of the duration and timing of each injection event; the dwell between injection events; and, the injection pressure may be altered under the injection schedule alteration.

In an embodiment, in altering the injection schedule, a second fuel may be introduced into the injection scheme. The first fuel and second fuel used can either be the same type of fuel or different fuels from each others. For example, the first fuel could be diesel or natural gas or any suitable fuel. Similarly, the second fuel could be diesel or natural gas or any suitable fuel. In an embodiment, the first fuel is natural gas and the second fuel is diesel. In another embodiment, the first fuel and the second fuel are both diesel.

The quantity of injections in the method 400 may be one or more injections. In the initial fuel event, there may be one or more than one injections. Similarly, after altering the injection schedule, the quantity of injections may be more or less. Post or pre injections may be added (or deleted) upon altering the injection schedule. In an embodiment, as FIG. 7B depicts, there may be a single post injection 620 added after the primary injection 610. In an embodiment, as FIG. 7C depicts, there may be two post injections 620 after the primary injection 610. The quantity of post injections 620, if added or removed, is determined based on the comparing 404. For example, as the fuel injector(s) wear over its life, as the comparing step 404 will determine, the fuel injector(s) performance will degrade even further. As such, the method 400 may initially add a single post injection 620 per one primary injection event 610. However, in time, over the life of the fuel injector, the method 400 may add a second post injection per primary injection event as determined. As the embodiment in FIG. 7D illustrates, a pre-injection, or pilot, 605 maybe added prior to the primary fuel injection event 610.

The measured engine parameter(s) that are compared to one or more reference values may comprise one or more of: an age of the fuel injector, a quantity of injections that the fuel injector has undergone, an emission measurement, an air/fuel measurement, an injector flow drift, a megawatt/ hours operation of the engine, an engine torque, time elapsed, a soot concentration, vehicle (e.g., locomotive, off highway vehicle, truck, car, etc.) miles, and the like. The air/fuel measurement could be, for example, the air-to-fuel ratio or the oxygen-to-fuel ratio.

In an embodiment, the method 400 may also adjust the timing of the primary injection event. For example, the start of the primary injection event may be started earlier and/or the finish of the primary injection event may be adjusted. (See e.g., FIGS. 2B, 3B).

As discussed, the comparing 404 may be repeated. In an embodiment, the comparing 404 may be repeated periodically (e.g., monthly, hourly, daily, etc.). In another embodiment, the comparing 404 may be commenced a first time or a second time (i.e., repeated) upon a certain ambient condition, a calendar event, an emission condition, a maintenance event, or an engine operating condition. Alternatively, the comparing 404 may be commenced by a user or tool request.

For example, the ambient condition may be a curtain elevated temperature (e.g., over 90° F.) or above a certain elevation (e.g., above 4,000 above sea level). Similarly, the calendar event could be quarterly, annually, monthly, and the like. The emission condition could be directly or indirectly measured. The directly measured emission condition may comprise, for example, a soot measurement in the exhaust. Similarly, the indirectly measured emission condition may comprise, for example, inferring an emission condition based on another parameter(s). One example would be to measure the oxygen-to-fuel ratio and from that measurement comparing it to a predetermined or reference value for oxygen-to-fuel ratio. If the measured oxygen-to-fuel ratio was below the predetermined or reference value, then post injection(s) could be added. Similarly, the maintenance event could be an annual maintenance event, an oil change event, and the like.

Figure 7A:
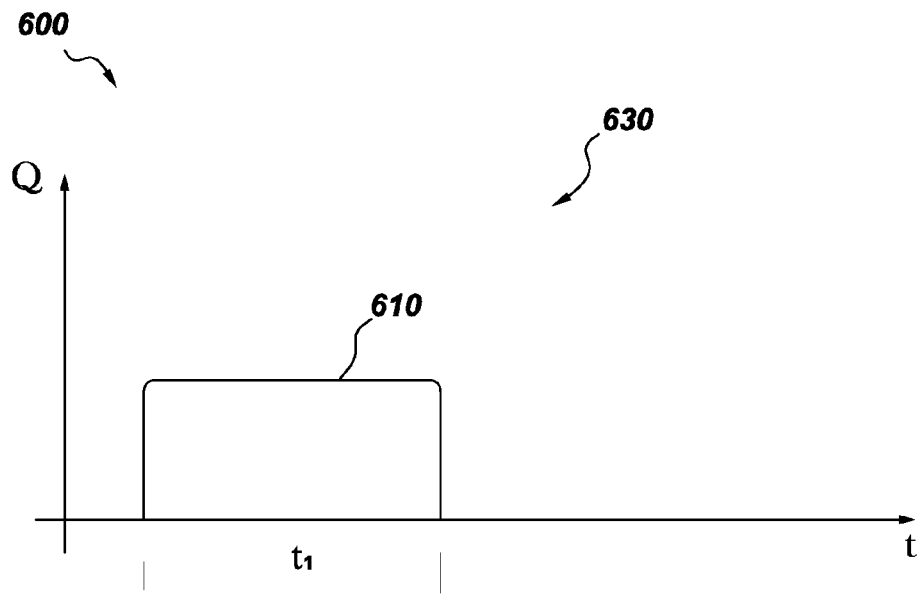
FIGS. 7A-7D are various graphs showing fuel flow (Q) over time (t) for a single injection event, according to aspects of the present invention.
Figure 7B:
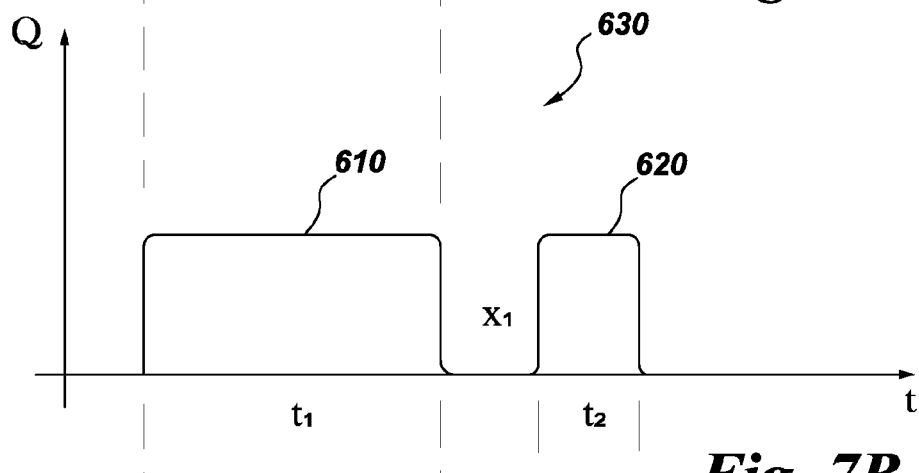
Figure 7C:
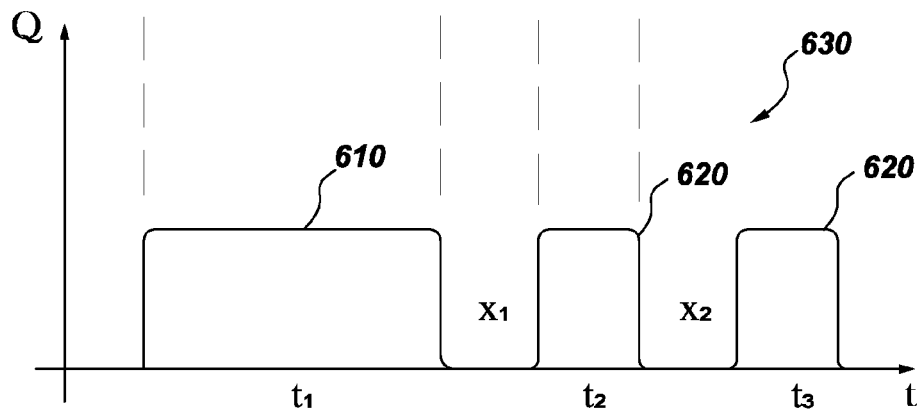
Figure 7D:
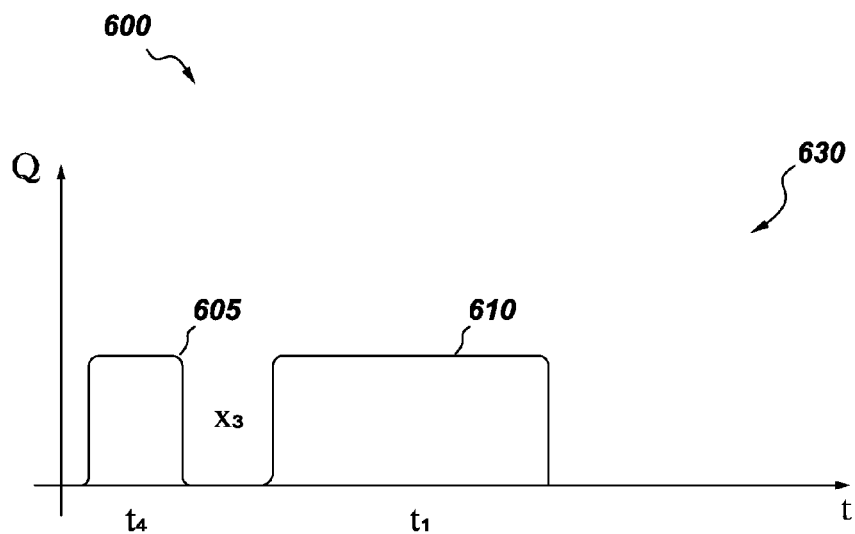

Referring collectively to FIGS. 7A-7D, graphs depicting fuel flow (Q) over time (t) for a single injection event are shown as 600 according to various embodiments of the present invention. FIG. 7A, for example, shows a fuel event 630 comprising a single, primary fuel event 610 extending over a time duration, $t_1$. Contrastingly, FIG. 7B shows a fuel event 630 comprising both a first fuel event 610, having duration $t_1$, followed by a single post injection event 620, having duration $t_2$. There is passage of time, or dwell, between the primary fuel event 610 and the single post injection event 620, shown as $x_1$. FIG. 7C depicts still another embodiment, wherein a fuel event 630 comprises a primary fuel event 610 following by two post injection events 620, each having duration $t_2$. There is a passage of time, or dwell, between the first fuel event 610 and each of the two post injection events 620 shown as $x_1$. FIG. 7D depicts another embodiment wherein the fuel event 630 comprises a primary fuel event 610 preceded by a pre-injection, or pilot, event 605, having a duration $t_4$. The amount of time, or dwell, between the pilot 605 and the primary fuel event 610 is shown as $x_3$.

Figure 8A:
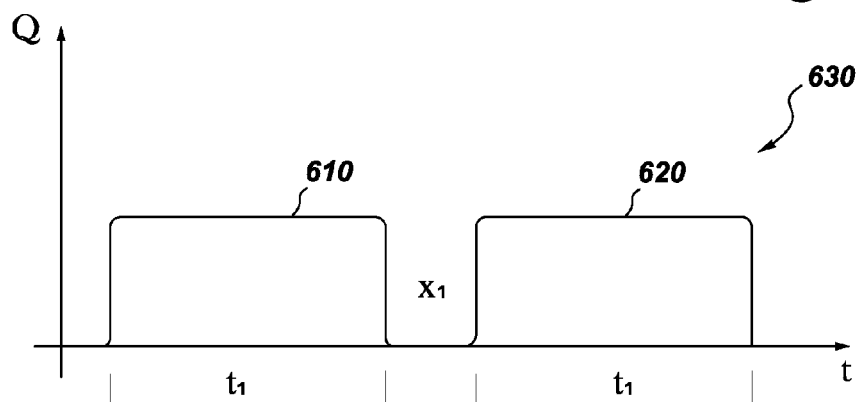
FIGS. 8A-8B are various graphs showing fuel flow (Q) over time (t) for a single injection event, according to other aspects of the present invention.
Figure 8B:
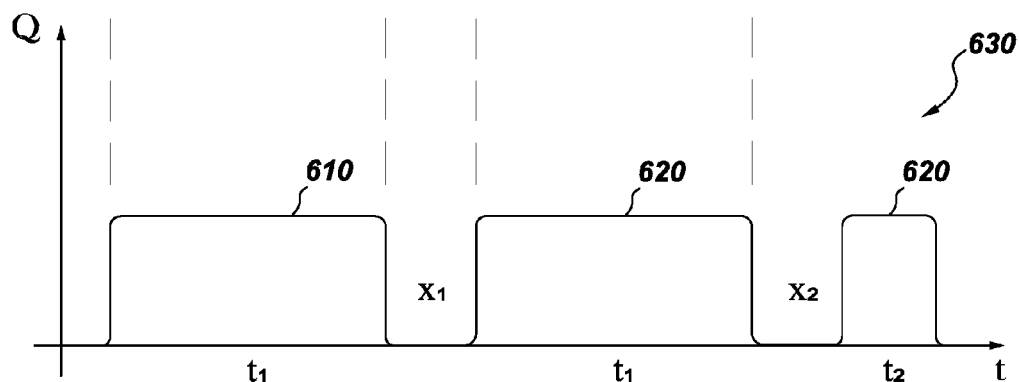

FIGS. 8A and 8B are graphs depicting fuel flow (Q) over time (t) for a single injection event according to various embodiments of the present invention. As FIG. 8A shows, an initial injection schedule (i.e., prior to altering) may comprise two (or more) injections made up of a primary injection 610 and a post injection 620 each having the same duration $t_1$. The time between the injections, or dwell, may be $x_1$. As FIG. 8B shows, after altering of the injection schedule, a second post injection 620, of a duration $t_2$, can be added after a dwell of $x_2$.

Referring to FIG. 6, another method 500 includes first injecting a first fuel in an internal combustion engine during injection events at 502. Then the method 500 measures one, or more, engine parameters of the fuel injected internal combustion engine during operation at 502. The method 500 then compares the one or more measured engine parameters 504 to one or more reference values 506 contained in a referenced database 34 (see e.g., FIG. 4). Based on the comparing at 504, the method 500 may then add a post-injection of a second fuel during the injection events 508. As the dotted return arrow shows, after 508 (i.e., adding post-injection) the method 500 may repeat back to step 503 (i.e., measuring).

The first fuel and second fuel used can either be the same type of fuel or different fuels from each others. For example, the first fuel could be diesel or natural gas or any suitable fuel. Similarly, the second fuel could be diesel or natural gas or any suitable fuel. In an embodiment, the first fuel is natural gas and the second fuel is diesel. In another embodiment, the first fuel and the second fuel are both diesel.

The quantity of post injections in the method 500 may be one or more post injections. In an embodiment, as FIG. 7B depicts, there may be a single post injection 620 after the primary injection 610. In an embodiment, as FIG. 7C depicts, there may be two post injections 620 after the primary injection 620. The quantity of post injections 620 is determined based on the comparing 504. For example, as the fuel injector(s) wear over its life, as the comparing step 504 will determine, the fuel injector(s) performance will degrade even further. As such, the method 500 may initially add a single post injection per one primary injection event. However, in time, over the life of the fuel injector, the method 500 may add a second post injection per primary injection event as determined.

The measured engine parameter(s) that are compared to one or more reference values may comprise one or more of: an age of the fuel injector, a quantity of injections that the fuel injector has undergone, an emission measurement, an air/fuel measurement, an injector flow drift, a megawatt/hours operation of the engine, an engine torque, time elapsed, a soot concentration, vehicle (e.g., locomotive, off highway vehicle, truck, car, etc.) miles, and the like. The air/fuel measurement could be, for example, the air-to-fuel ratio or the oxygen-to-fuel ratio.

In an embodiment, the method 500 may also adjust the timing of the injection event. For example, the start of the primary injection event may be started earlier and/or the finish of the primary injection event may be adjusted. (See e.g., FIGS. 2B, 3B).

As discussed, the measuring 502 and/or comparing 504 may be repeated. In an embodiment, the comparing 504 may be repeated periodically (e.g., monthly, hourly, daily, etc.). In another embodiment, the comparing 504 may be commenced a first time or a second time (i.e., repeated) upon a certain ambient condition, a calendar event, an emission condition, a maintenance event, or an engine operating condition. Alternatively, the comparing 504 may be commenced by a user or tool request.

For example, the ambient condition may be a curtain elevated temperature (e.g., over 90° F.) or above a certain elevation (e.g., above 4,000 above sea level). Similarly, the calendar event could be quarterly, annually, monthly, and the like. The emission condition could be directly or indirectly measured. The directly measured emission condition may comprise, for example, a soot measurement in the exhaust. Similarly, the indirectly measured emission condition may comprise, for example, inferring an emission condition based on another parameter(s). One example would be to measure the oxygen-to-fuel ratio and from that measurement comparing it to a predetermined or reference value for oxygen-to-fuel ratio. If the measured oxygen-to-fuel ratio was below the predetermined or reference value, then post injection(s) could be added. Similarly, the maintenance event could be an annual maintenance event, an oil change event, and the like.

As FIGS. 7A-7D and 8A-8B depict certain embodiments, it should be apparent other embodiments are possible without departing from the present invention. For example, the quantity of pre and post injections, duration of first fuel event 610 and/or pre injections 605 and/or post injection(s) 620, and duration of time (dwell) between fuel injecting 605, 610, 620 may vary from what is depicted. For example, the duration of post injections 620, in the case of two (or more) post injections 620, may be non-uniform. Also, the time relationships between pre injection 605, the primary fuel injection 610, the post injection(s) 620, and the times there between is not necessarily to scale. Similarly, the pre injection(s) 605 and post injection(s) 620 may temporally overlap with the primary fuel event 610 in an embodiment where two different fuels are used. For example, the primary fuel event 610 may use natural gas as a first fuel, while a second fuel during the post injection event(s) 620 is diesel, in which case the diesel, in an embodiment, may be injected with a temporal overlap (partially or entirely) with the natural gas injection.

Similarly, as discussed in referenced U.S. application Ser. No. 14/708,920, the duration, starting point, and/or ending point of the primary fuel event 610 similarly may change over time and the life of the fuel injector in response to various input(s).

With any of these methods, or combination of methods, the method can be conducted in a variety of ways. The method(s) may continually be repeated. Alternatively, the method(s) may be executed when a new fuel injector(s) is first installed, so as to determine a "baseline" fuel injection event duration for future comparison. Still alternatively, the method(s) may be repeated intermittently and automatically based on fixed events. For example, and not by limitation, the method(s) could be repeated after a fixed duration (e.g., every X hours of operation, every Y months) or event (e.g., after X miles of travel by the vehicle having the engine, after certain maintenance events) or after a predetermined quantity of fuel injection events. Alternatively, the method(s) can be repeated by user election.

Any of the methodologies may optionally also use additional information to further improve the accuracy of the calculation(s). For example, corrections for various operating conditions can also be factored in. Operating conditions that can be used in this factoring include, but are not limited to, air temperature, atmospheric pressure, altitude, oil temperature, and the like.

The methodologies may be used for virtually any internal combustion engine that uses one or more fuel injectors. Fuel injectors operating at high fuel pressures (e.g., above about 2000 bar) have been found to benefit from the methodologies. However, the methodologies are not limited to only these high fuel pressures. In certain embodiments, the altering of the injection schedule may result in altering the fuel injection pressure(s).

The methodologies may also be used with internal combustion engines that use one or more than one fuel type. For example, and not by limitation, the methods can be used on a duel fuel engine such as an internal combustion engine that operates on diesel and natural gas. Other fuels besides diesel and natural gas include ethanol, gasoline, methanol, and the like.

While the embodiments illustrated and described herein may be used with a vehicle having an internal combustion engine, in turn, having one or more fuel injectors, other systems may employ aspects of the present invention without departing from the scope of the invention. For example, the internal combustion engine may be stationary or on a vehicle. Similarly, the engine may have multiple fuel delivery systems besides only having one or more fuel injectors, and the like. In an embodiment, the fuel injectors need not be injecting directly into the combustion chamber. In still other embodiments, other devices or engines other than only internal combustion engines yet that still use fuel injection means can also gain advantage with the inventions herein.

Therefore, in accordance with one aspect of the invention, there is a method of injecting fuel in an internal combustion engine, wherein the method comprises: conducting a primary injection of a first fuel in the internal combustion engine, thereby defining a primary fuel event, according to an injection schedule within an engine cycle; comparing a measured engine parameter to a reference value; and altering the injection schedule applied to the internal combustion engine, based on the comparing.

According to another aspect of the present invention, a method of operating a fuel injected internal combustion engine, the method comprises: during injection events, injecting a first fuel in a combustion chamber of the fuel injected internal combustion engine; measuring at least one engine parameter of the fuel injected internal combustion engine during operation; comparing the at least one engine parameter to a reference value; adding a post injection event of a second fuel during the injection events, based on the comparing.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

What is claimed is:

1. A method of injecting fuel in an internal combustion engine, the method comprising:
  conducting a primary injection of a first fuel in the internal combustion engine, thereby defining a primary fuel event, according to an injection schedule within an engine cycle, wherein the injection schedule comprises a quantity of injection events with the engine cycle, and wherein the quantity of injection events comprise at least one post injection;
  comparing a measured engine parameter to a reference value; and
  altering the injection schedule applied to the internal combustion engine, based on the comparing.

2. The method of claim 1, wherein the injection schedule for an engine cycle further comprises one of duration of injection event, timing of injection event, duration between injection events, and injection pressure.

3. The method of claim 1, wherein the measured engine parameter comprises at least one of: an age of the fuel injector, a quantity of injections, an emission measurement, an air/fuel measurement, a injector flow drift, a megawatts-hours operation, an engine torque, time, soot concentration, and vehicle miles.

4. The method of claim 3, wherein the air-fuel measurement comprises one of an air-to-fuel ratio and an oxygen-to-fuel ratio.

5. The method of claim 1, wherein the quantity of injection events is determined based on the comparing.

6. The method of claim 1, wherein altering the injection schedule, comprises injecting a second fuel, wherein the second fuel comprises one of diesel and natural gas.

7. The method of claim 1, wherein the first fuel comprises one of diesel and natural gas.

8. The method of claim 6, wherein the first fuel is different than the second fuel.

9. The method of claim 6, wherein the first fuel is the same as the second fuel.

10. The method of claim 1, wherein the altering the injection schedule comprises adding a post injection if the comparing results in the measured engine parameter being above or below a threshold value.

11. A method of operating a fuel injected internal combustion engine, the method comprising:
   during injection events, injecting a first fuel in a combustion chamber of the fuel injected internal combustion engine;
   measuring at least one engine parameter of the fuel injected internal combustion engine during operation;
   comparing the at least one engine parameter to a reference value;
   adding a post injection event of a second fuel during the injection events, based on the comparing.

12. The method of claim 11, wherein the post injection event comprises a plurality of post injection events.

13. The method of claim 11, wherein the at least one engine parameter comprises at least one of: an age of the fuel injector, a quantity of injections, an emission measurement, an air/fuel measurement, a injector flow drift, a megawatts-hours operation, an engine torque, time, soot concentration, and vehicle miles.

14. The method of claim 13, wherein the air-fuel measurement comprises one of an air-to-fuel ratio and an oxygen-to-fuel ratio.

15. The method of claim 11, wherein a quantity of post injections is determined based on operating conditions.

16. The method of claim 11, further comprising adjusting one of a start and a finish of the injecting, based on the measuring.

17. The method of claim 11, wherein the first fuel and the second fuel comprises one of diesel and natural gas.

18. The method of claim 11, wherein the first fuel and the second fuel are different.

19. The method of claim 11, wherein the first fuel and the second fuel are the same.

20. The method of claim 11, further comprising repeating the measuring.

21. The method of claim 11, wherein a frequency of the measuring is periodic.

22. The method of claim 11, wherein the measuring is commenced based on one of:
   an ambient condition;
   a user or tool request;
   a calendar event;
   a maintenance event;
   an engine operating condition;
   a recurring event; and
   an emissions condition.

23. The method of claim 11, wherein the adding further comprises adding a post injection if the comparing results in the measured at least one engine parameter being above or below a threshold value.

24. The method of claim 11, further comprising, based on the comparing, altering at least one of: a duration of the injection event, timing of an injection event, duration between injection events, and injection pressure.

* * * * *